(12) United States Patent
Josiam et al.

(10) Patent No.: US 9,078,235 B2
(45) Date of Patent: Jul. 7, 2015

(54) METHODS FOR EFFICIENT CONFIGURATION OF CONTROL CHANNEL TRANSMISSION IN WIRELESS SYSTEMS

(75) Inventors: Kaushik Josiam, Dallas, TX (US); Zhouyue Pi, Richardson, TX (US); Baowei Ji, Plano, TX (US); Ying Li, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 729 days.

(21) Appl. No.: 12/855,978

(22) Filed: Aug. 13, 2010

(65) Prior Publication Data

US 2011/0051649 A1 Mar. 3, 2011

Related U.S. Application Data

(60) Provisional application No. 61/237,608, filed on Aug. 27, 2009.

(51) Int. Cl.
*H04W 72/00* (2009.01)
(52) U.S. Cl.
CPC .................................. *H04W 72/005* (2013.01)
(58) Field of Classification Search
CPC .................................................. H04W 72/005

USPC ....................... 370/312, 390, 395.3, 252, 329
See application file for complete search history.

(56) References Cited

U.S. PATENT DOCUMENTS 7,869,401 B2 * 1/2011 Dang et al. .................... 370/329

FOREIGN PATENT DOCUMENTS

KR 10-2008-0085318 A 9/2008
WO 2009/012649 A1 1/2009

OTHER PUBLICATIONS

Samsung Electronics et al., "Proposed Text for Section 16.9.3.1 E-MBS Configuration Indicators", IEEE 802.16 Broadband Wireless Access Working Group, IEEE 802.16m-09/2779r1, Jan. 14, 2009
Intel Cooperation et al., "IEEE 802.16m System Description Document (SDD)", IEEE 802.16 Broadband Wireless Access Working Group, IEEE 802.16m-09/0034, Jul. 27, 2009.

* cited by examiner

*Primary Examiner* — Chandrahas Patel
(74) *Attorney, Agent, or Firm* — Jefferson IP Law, LLP

(57) ABSTRACT

An apparatus and method for configuring Enhanced Multicast and Broadcast Service (E-MBS) Scheduling Intervals (MSIs) in a communication system are provided. The method includes selecting a number N of MSIs, and selecting a periodicity of each of the N MSIs. By selecting a number N of MSIs and a periodicity of each of the N MSIs, a communication system is able to more efficiently decode E-MBS data.

34 Claims, 9 Drawing Sheets

METHODS FOR EFFICIENT CONFIGURATION OF CONTROL CHANNEL TRANSMISSION IN WIRELESS SYSTEMS

CROSS-REFERENCE TO RELATED APPLICATIONS

This application claims the benefit under 35 U.S.C. §119 (e) of a Provisional application filed on Aug. 27, 2009 in the U.S. Patent and Trademark Office and assigned Ser. No. 61/237,608, the entire disclosure of which is hereby incorporated by reference.

BACKGROUND OF THE INVENTION

1. Field of the Invention

The present invention relates to an apparatus and method for controlling multicast and broadcast information. More particularly, the present invention relates to an apparatus and method for transmitting control information for a multicast and broadcast service.

2. Description of the Related Art

Mobile stations were originally developed to provide simple wireless communication between users. As technology has advanced, mobile stations now provide many additional and advanced features beyond the simple telephone conversation. One advanced feature is the provision of multimedia entertainment.

To provide multimedia entertainment on a mobile station, much higher data rates are required as compared to those needed for providing a voice service or even for providing a Short Messaging Service (SMS). To address the provision of multimedia entertainment in the next generation wireless systems, different standards bodies have assigned specific services for this task. For example, in the $3^{rd}$ Generation Partnership Project (3GPP) standard, the multimedia content is carried on a Multimedia Broadcast and Multicast Service (MBMS). In 3GPP2, it is carried on a Broadcast and Multicast Service (BCMCS), and in the Institute of Electrical and Electronics Engineers' (IEEE) Air Interface for Fixed Broadband Wireless Access Systems 802.16 standard, it is carried on a Multicast and Broadcast Service (MBS).

The body of IEEE 802.16 standards includes the 802.16e standard, and the 802.16m standard, which is currently under development to enhance the 802.16e standard. Accordingly, the enhancements to the MBS in the 802.16m standard are termed "Enhanced-MBS" (E-MBS). In the IEEE 802.16e standard, control signaling for MBS is transmitted as an MBS MAP message. The MBS MAP message conveys information required to decode an MBS data burst of the service to which a user subscribes and may include control signaling to decode MBS data bursts for various subscriptions. Information necessary for decoding all MBS data bursts in an MBS zone will be transmitted in the MBS MAP. Consequently, the MBS MAP will contain as many Information Elements (IEs) as the number of services offered. Each MBS service is identified by a unique combination of Station ID (STID) and Flow ID (FID). To accommodate different transmission scenarios, different types of IEs have been defined by the IEEE 802.16 standard. More particularly, the IEs are categorized into MBS_DATA_IE, MBS_DATA_Time_Diversity_IE and Extended_MBS_DATA_IE. Depending on the transmission scenario for the MCIDs in the zone, the MBS MAP may contain some or all of the IEs.

FIG. 1 illustrates a Frame configuration according to the related art.

In the proposed IEEE 802.16m standard, E-MBS is a downlink transmission from a Base Station (BS) to one or more Mobile Stations (MSs) subscribing to the service. The downlink of the IEEE 802.16m standard uses an Orthogonal Frequency Division Multiplexing (OFDM) modulation scheme for transmission to the MSs. OFDM is a multi-carrier technique where the available bandwidth is split into many small bands known as subcarriers using simple Inverse Fast Fourier Transform/Fast Fourier Transform (IFFT/FFT) operations, wherein the subcarriers' bandwidths are the same. Subcarriers are used to carry either control signaling or data for MSs. An OFDM symbol is a collection of subcarriers that span the system bandwidth. Further, to make resource utilization more efficient, OFDM symbols are grouped to form a sub-frame. In the IEEE 802.16m standard and as illustrated in FIG. 1, 6 OFDM symbols 101 are used to form a regular sub-frame 103 that is 0.625 ms long, 8 such regular sub-frames form a frame 105 that is 5 ms long, and 4 frames form a Super Frame 107 that spans 20 ms.

An E-MBS Scheduling Interval (MSI) is currently defined in the IEEE 802.16m-08/003r6 draft System Description Document (SDD). The E-MBS MSI refers to a number of successive frames for which the access network may schedule traffic for the streams associated with the E-MBS prior to the start of the interval. The length of this interval depends on the particular use case of the E-MBS and is dictated by the minimum switching time requirement that is set in the IEEE 802.16m-08/002r7 System Requirements Document (SRD). In other words, MSI refers to the transmission frequency of a particular E-MBS stream and thus the frequency at which the E-MBS MAP is transmitted. Additionally, the SDD mentions that the E-MBS MAP message may be structured such that it efficiently defines multiple transmission instances for a given stream within an MSI. It is also worth noting that in the sub-frames in which the E-MBS MAP is transmitted, it is transmitted in the first few resource units reserved for E-MBS. The resource units reserved for E-MBS are transmitted in the broadcast channel called the Super Frame Header (SFH).

The E-MBS MAP is transmitted once at the beginning of the MSI and carries with it all the required control information to decode the scheduled traffic over the duration of the MSI. Therefore, the E-MBS MAP is not transmitted in all Super Frames but once every few Super Frames as defined by the MSI. Further, while the duration of the MSI can change over time, the change is not indicated to the MS. Hence, when an MS attempts to receive the E-MBS, it must blindly decode each sub-frame carrying E-MBS data until it can decode the E-MBS MAP. The blind decoding by the MS unnecessarily consumes power and resources.

Accordingly, there is a need for an improved apparatus and method for transmitting control information regarding the transmission of E-MBS MAP.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting control information regarding transmission of Enhanced Multicast and Broadcast Service (E-MBS) MAP.

In accordance with an aspect of the present invention, a method for configuring E-MBS Scheduling Intervals (MSIs)

in a communication system is provided. The method includes selecting a number N of MSIs, and selecting a periodicity of each of the N MSIs.

In accordance with another aspect of the present invention, a method for receiving an E-MBS MAP is provided. The method includes determining a number N of available MSIs and a periodicity of each of the N MSIs, and determining if an E-MBS MAP is received using one of the N MSIs.

In accordance with yet another aspect of the present invention, an apparatus for configuring MSIs in a communication system is provided. The apparatus includes a transmitter for transmitting an E-MBS MAP, and a controller for selecting a number N of MSIs and for selecting a periodicity of each of the N MSIs.

In accordance with still another aspect of the present invention, an apparatus for receiving an E-MBS MAP is provided. The apparatus includes a transceiver for receiving the E-MBS MAP, and a controller for determining a number N of available MSIs and a periodicity of each of the N MSIs, and for determining if the E-MBS MAP is received using one of the N MSIs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a Mobile Station (MS). However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

In the Institute of Electrical and Electronics Engineers (IEEE) 802.16m standard, the construction of Enhanced-Multicast and Broadcast Service (E-MBS) MAP is currently under consideration. In that regard, exemplary embodiments of the present invention provide an apparatus and method for signaling and decoding the periodicity of the E-MBS MAP. That is, exemplary embodiments of the present invention provide an apparatus and method for signaling and decoding an E-MBS Scheduling Interval (MSI).

Figure 1:
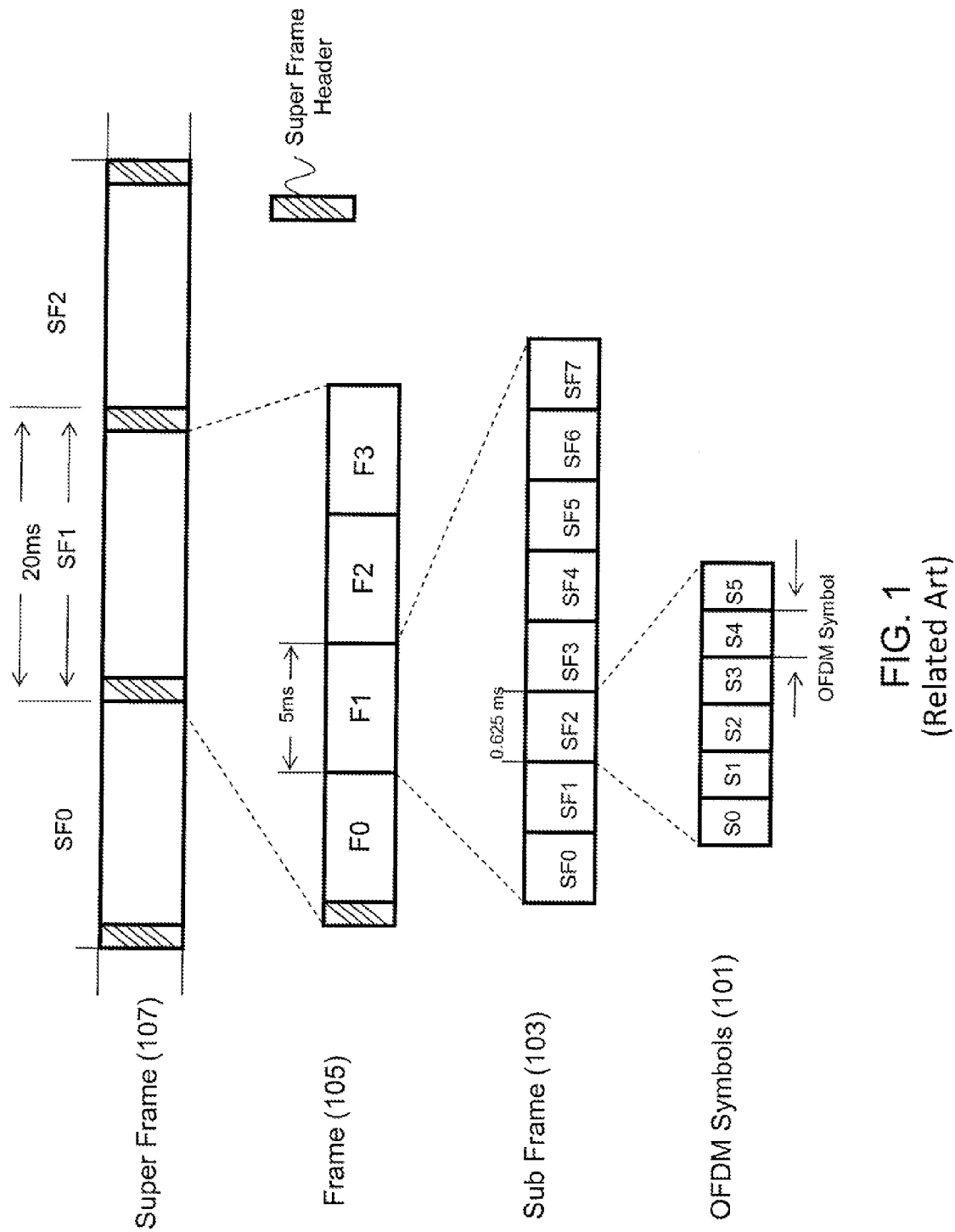
FIG. 1 illustrates a Frame configuration according to the related art.
Figure 2:
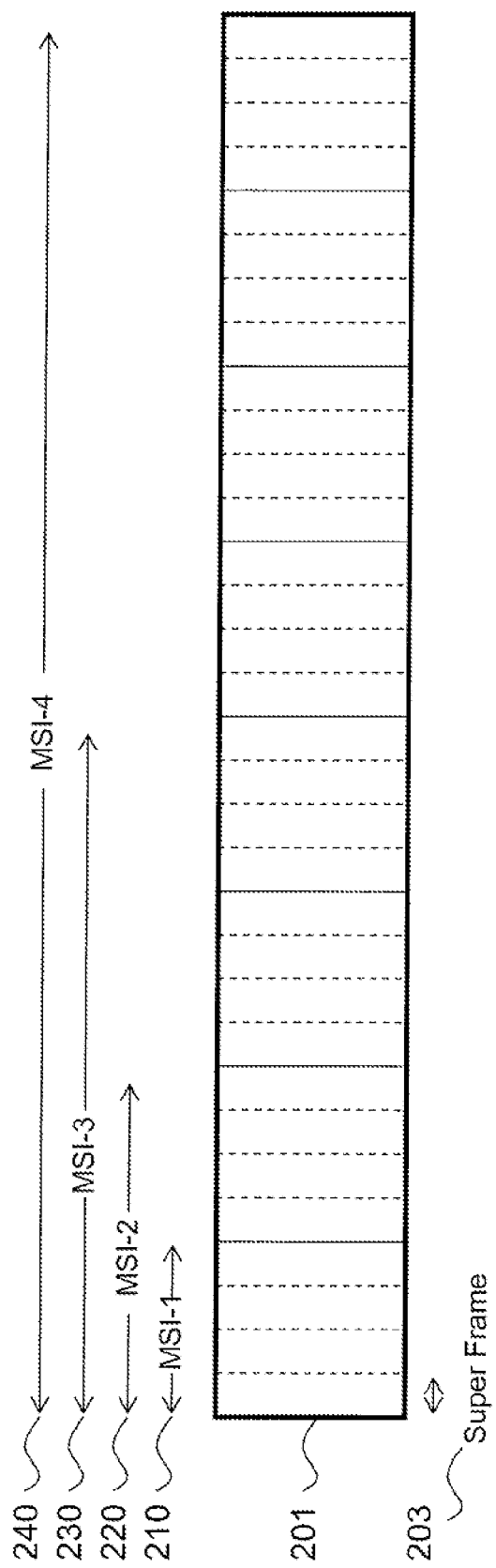
FIG. 2 illustrates a configuration of Enhanced-Multicast and Broadcast Service (E-MBS) Scheduling Intervals (MSIs) according to an exemplary embodiment of the present invention.

FIG. 2 illustrates a configuration of MSIs according to an exemplary embodiment of the present invention.

Referring to FIG. 2, a frame structure 201, including a plurality of Super Frames 203, is established by a network employing an IEEE 802.16m communication system. Using the frame structure 201, the network may provide an E-MBS to one or more MSs subscribing to the E-MBS. To decode information transmitted as part of the E-MBS, a subscribing MS must receive an E-MBS MAP that is transmitted at the beginning of an interval of successive Super Frames for which the E-MBS data is scheduled, the interval of successive Super Frames being the MSI. According to an exemplary embodiment of the present invention, the network establishes a plurality of MSIs that each assumes a different periodicity. In the example of FIG. 2, four MSIs including MSI-1 210, MSI-2 220, MSI-3 230, and MSI-4 240 are provided, each MSI having a different periodicity.

More generally, according to an exemplary embodiment of the present invention, any number N of MSIs can be established by a network, wherein each of the N MSIs has a different periodicity. While the embodiment of FIG. 2 illustrates an example in which N=4, it is to be understood that the value of N=4 is merely for example and that the value of N can be determined based on the various requirements of E-MBS traffic to be transmitted. Moreover, according to exemplary embodiments of the present invention, the value of N can be fixed or variable. If the value of N is variable, then the MSI must be signaled, for example by a Base Station (BS) providing the E-MBS service. In an exemplary implementation, the MSI signaling can be part of a MAC management message transmitted on a common control channel. On the other hand, if the value of N is fixed, it can be assumed that the value of N, as well as the periodicities associated with each of the N MSIs, is known by the MS. That is, it can be assumed that the MS has previously received a control message from the BS indicating the fixed value of N that is currently in use. For example, the MS may receive an Advanced Air Interface—System Configuration Descriptor (AAI-SCD) message indicating the MSI currently used.

In the example of FIG. 2, the value of N is set to four such that there are four allowable MSIs, specifically MSI-1 210, MSI-2 220, MSI-3 230, and MSI-4 240. As such, the E-MBS MAP and E-MBS traffic can be transmitted using any one of the MSIs 210, 220, 230, and 240. Given that a Super Frame is 20 ms in duration, the smallest MSI 210 is 80 ms long as it consists of 4 Super Frames. The second smallest MSI 220, which includes 8 Super Frames, is 160 ms in length. MSI-3, which contains 16 Super Frames, and MSI-4, which contains 32 Super Frames are respectively 320 ms and 640 ms in length.

Again, the number N of MSIs and their periodicities as illustrated in FIG. 2 is merely for example and the number N of MSIs and the periodicity of each MSI may vary based on the requirements of E-MBS traffic to be transmitted. Accordingly, an exemplary implementation of the present invention may include any number N of MSIs established by a network wherein each MSI has a unique periodicity that is unrelated to the periodicity of another MSI. In another exemplary implementation, the network may establish N MSIs having periodicities that are related. For example, the network may establish MSIs having nested periodicities that are multiples of each other as illustrated in FIG. 2. That is, MSI 1 210, having a periodicity of 4 Super Frames, is nested within MSI 2 220 having a periodicity of 8 Super Frames, which is two times that of MSI 1 210. MSI 1 210 is also nested within MSI 3 230 and MSI 4 240 having periodicities of 16 Super Frames and 32 Super Frames, respectively. Similarly, MSI 2 220 is nested within MSI 3 230 and MSI 4 240, and MSI 3 230 is nested within MSI 4 240, each succeeding MSI being a multiple of the previous MSI. By nesting MSIs having periodicities that are multiples of each other as illustrated in FIG. 2, the network may reduce overhead when signaling the MSIs to the one or more MSs subscribing to the E-MBS and, as will be explained in more detail below, may reduce the complexity of an E-MBS MAP decoding process used by an MS.

Figure 3:
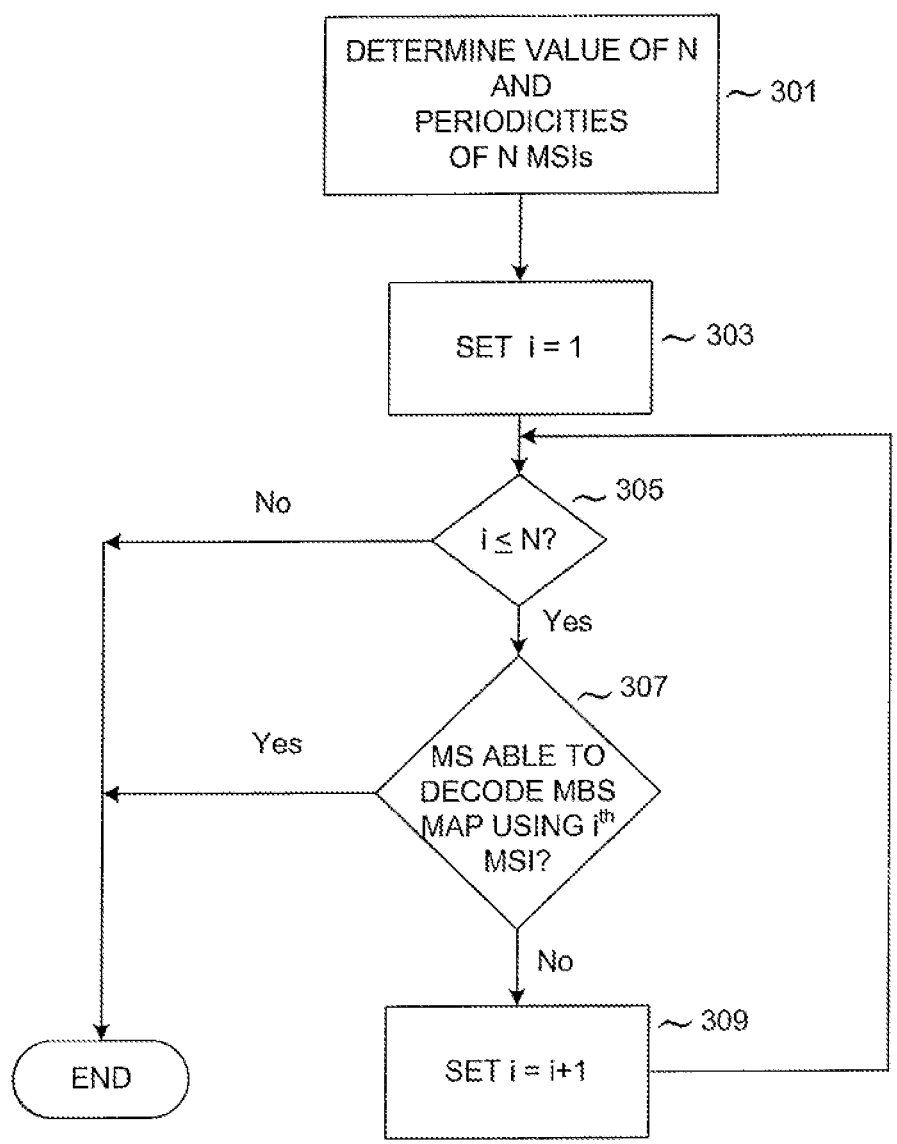
FIG. 3 is a flowchart illustrating a method for determining an MSI according to an exemplary embodiment of the present invention.

FIG. 3 is a flowchart illustrating a method for determining an MSI according to an exemplary embodiment of the present invention.

According to an exemplary embodiment of the present invention, an MS that desires to receive an E-MBS will attempt to decode an E-MBS MAP in order to receive E-MBS data. To receive and decode the E-MBS MAP, the MS will first attempt to decode the E-MBS MAP using the smallest MSI periodicity. If decoding of the E-MBS MAP is unsuccessful using the smallest periodicity, the MS will attempt to decode the E-MBS MAP using the next smallest MSI periodicity at which the E-MBS MAP may be transmitted.

Referring to FIG. 3, an MS determines a value of N and the periodicities of N MSIs in step 301. As discussed above, the value of N and the associated periodicities of the N MSIs may be fixed or variable. If the value is fixed, it may be assumed that the MS is aware of the value of N and the associated periodicities. On the other hand, if the value is variable, the MS may receive control signaling (e.g., a MAC management message) indicating the value of N and the associated periodicities. In step 303, the MS sets a counter variable i to 1 and in step 305 determines if i≤N. If it is determined in step 305 that i≤N, the MS determines in step 307 if it is able to decode the E-MBS MAP using the $i^{th}$ MSI. For example, referring to FIG. 2, the MS would first determine if it is able to decode the E-MBS MAP using MSI-1 210. If it is determined in step 307 that the MS is not able to determine the E-MBS MAP using the $i^{th}$ MSI, the MS proceeds to step 309 and increments i by 1. The MS returns to step 305 and again determines if i≤N. If it is determined that i>N, the MS ends the procedure. On the other hand, if it is determined that i≤N, the MS proceeds to step 307 and determines if it is able to decode the E-MBS MAP using the $2^{nd}$ MSI since i=2. If the MS is able to decode the E-MBS MAP using the $2^{nd}$ MSI, the MS ends the procedure. On the other hand, if the MS is not able to decode the E-MBS MAP using the $2^{nd}$ MSI, the MS again proceeds to step 309, increments i by 1 and continues with the subsequent steps.

It is to be understood that the procedure of FIG. 3 is merely an exemplary procedure of implementing an aspect of the present invention. For example, although the procedure of FIG. 3 first attempts to decode the E-MBS MAP using the MSI having the shortest periodicity, this is merely for example. In another exemplary implementation, the first MSI used for the decoding attempt could be the MSI having the longest periodicity. Moreover, while the procedure illustrated in FIG. 3 uses a counter variable (i) as a mechanism to move from one MSI to another, this is also merely one of many ways in which the decoding process could evaluate the N MSIs for decoding and is not to be construed as a mandatory variable.

In the following description, examples are provided of more specific logic that may be used by an MS when decoding an E-MBS MAP and of procedures an MS may use to adapt to a change in MSIs.

Figure 4A:
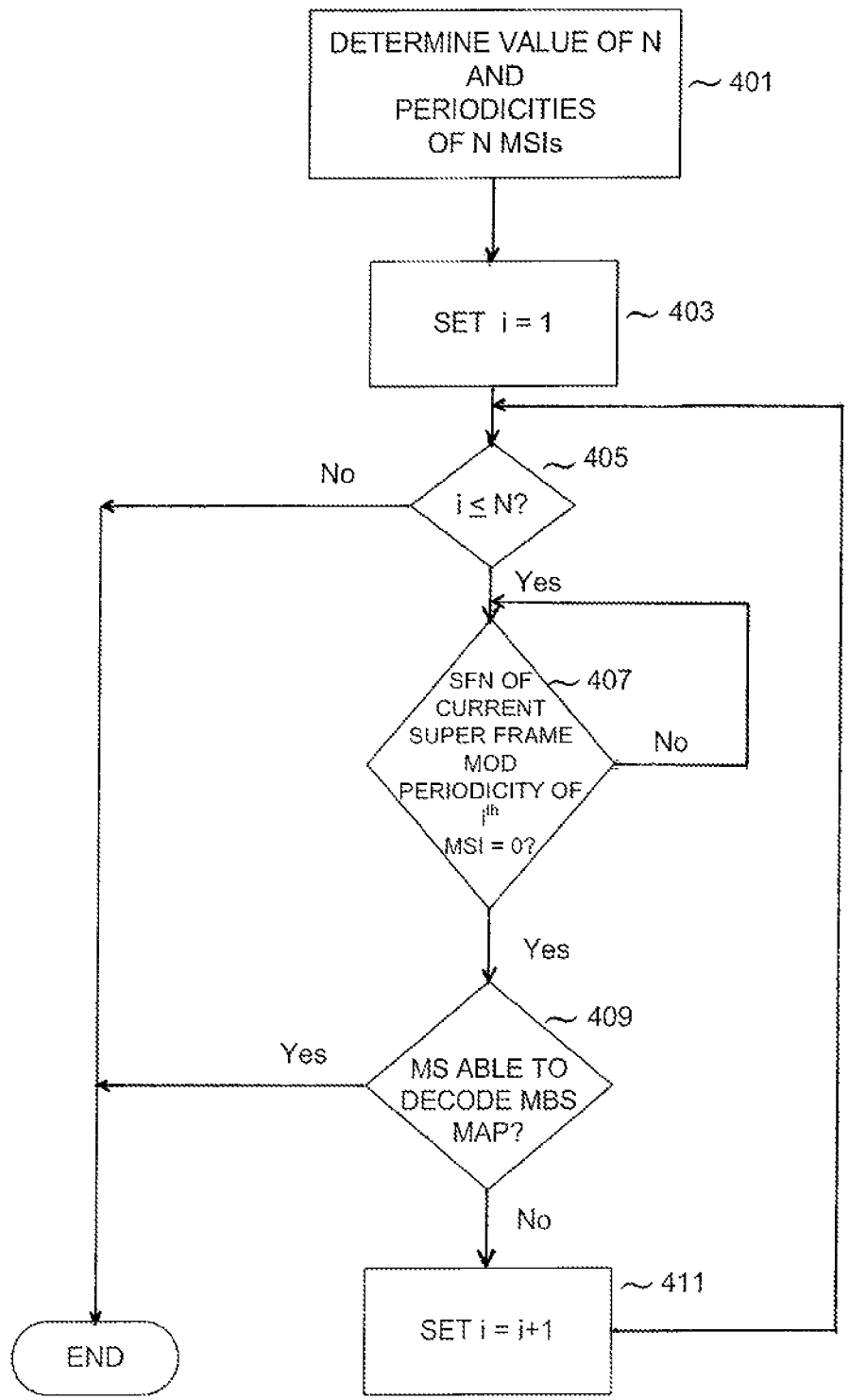
FIG. 4A is a flowchart illustrating a method for determining an MSI according to an exemplary embodiment of the present invention.
Figure 4B:
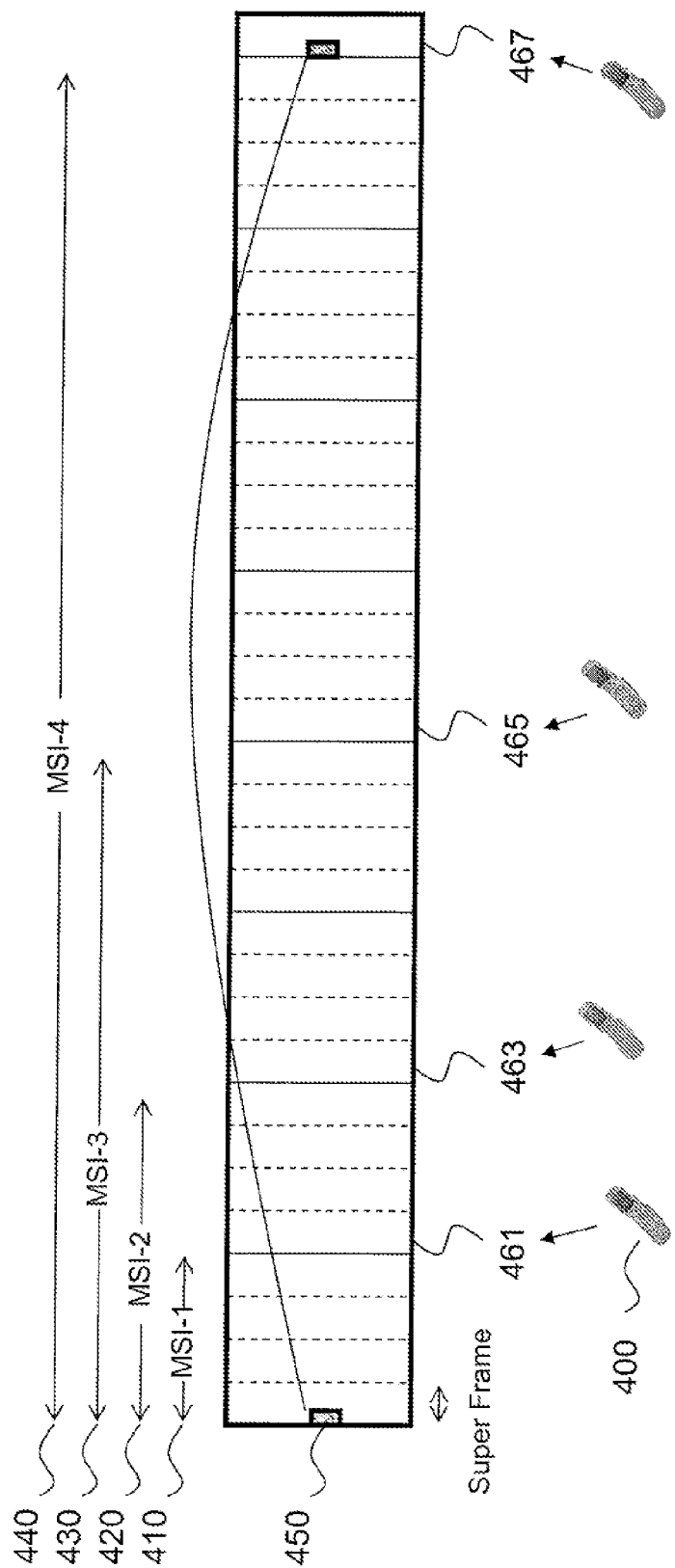
FIG. 4B illustrates an exemplary implementation of the method of FIG. 4A.

FIG. 4A is a flowchart illustrating a method for determining an MSI according to an exemplary embodiment of the present invention. FIG. 4B illustrates an exemplary implementation of the method of FIG. 4A.

According to an exemplary embodiment of the present invention, an MS may attempt to decode an E-MBS MAP by testing different hypotheses for MSIs. For example, in the IEEE 802.16m standard, a Super Frame is assigned a sequential Super Frame Number (SFN) which is transmitted in the Super Frame Header (SFH). As an example with reference to FIG. 4B, it is assumed that a network has established four different MSIs including MSI-1 410 of 4 Super Frames in length, MSI-2 420 of 8 Super Frames in length, MSI-3 430 of 16 Super Frames in length, and MSI-4 440 of 32 Super Frames in length. Based on the configuration of MSIs illustrated in FIG. 4B, the MS attempts to decode the E-MBS MAP based on the SFNs and the given MSI intervals. For example, the MS determines if the E-MBS MAP is transmitted with a periodicity of MSI-1 410 by determining if SFN mod 4=0, where mod is the modulo operator. The modulo operator determines the remainder when two numbers are divided. For example, x mod y=a determines the remainder a when x is divided by y. Since the MS only knows the different MSIs with which the E-MBS MAP may be transmitted and not the MSI of the current E-MBS MAP transmission, the MS must evaluate different Super Frames that could possibly carry the E-MBS MAP. In the example of FIG. 4B, if MSI-1 410 is currently used, the E-MBS MAP will be transmitted whenever SFN is an integer multiple of 4. Accordingly, the MS will check for the E-MBS MAP when the SFN of the current Super Frame is an integer multiple of 4.

Based on the exemplary configuration of FIG. 4B, there are four different MSI configurations MSI-1 410, MSI-2 420, MSI-3 430, and MSI-4 440, with MSI-1 410 having the shortest periodicity of 4 Super Frames, and MSI-4 440 having the longest periodicity of 32 Super Frames. If an MS comes online immediately after the first E-MBS MAP is transmitted, it must wait for the next E-MBS MAP transmission before it can receive the E-MBS service. In this case, MSI-1 410, having a periodicity of 4 Super Frames, is the shortest periodicity that it can test for. Accordingly, the MS determines if SFN mod 4=0. When the condition is true, the MS attempts to decode the E-MBS MAP. If decoding of the E-MBS MAP fails, the MS determines that the E-MBS MAP is transmitted at a different periodicity and determines another MSI for use in the logical operation. In the example of FIG. 4B, the MSI having the next largest periodicity is MSI-2 420, which is transmitted once every 8 Super Frames. Thus, the MS determines if SFN mod 8=0 and, if it does, attempts to decode the E-MBS MAP. If the MS fails to decode the E-MBS MAP in the Super Frame whose number satisfies SFN mod 8=0, the MS continues the procedure using the periodicities of MSI-3 430 and then MSI-4 440. In the example of FIG. 4B, the MS processes three attempts before decoding the E-MBS MAP when it is transmitted at an interval of MSI-4 440.

An exemplary method of implementing the above procedure is illustrated in FIGS. 4A and 4B. It is to be understood that the procedure of FIGS. 4A and 4B is merely for explanation and not to be construed as limiting. For example, the method of FIGS. 4A and 4B includes a counter variable i to track which MSI is being used for a modulo operation. However, use of the counter variable is merely an example of a means for progressing through MSIs and is not a necessity. Also, the above description of the invention refers to a modulo operator that is used for determining if the current Super Frame may include the E-MBS MAP. However, this too is merely for example as any appropriate operator could be used.

Referring to FIGS. 4A and 4B, an MS 400 determines a value of N and the periodicities of N MSIs in step 401. As discussed above, the value of N may be fixed or variable. In the example of FIGS. 4A and 4B, the value of N=4 wherein a first MSI 410 has a periodicity of 4 Super Frames, a second MSI 420 has a periodicity of 8 Super Frames, a third MSI 430 has a periodicity of 16 Super Frames, and a fourth MSI 440 has a periodicity of 32 Super Frames. In step 403, the MS 400 sets a counter variable i to 1 and in step 405 determines if i≤N. If it is determined in step 405 that i≤N, the MS 400 determines if the SFN of the current Super Frame mod periodicity of the $i^{th}$ MSI=0. For example, if i is currently set to 1 such that MSI-1 410 having a periodicity of 4 Super Frames is considered, the MS 400 determines if the current Super Frame's SFN mod 4=0. If it is determined in step 407 that SFN mod periodicity of the $i^{th}$ MSI=0 (i.e., if SFN mod 4=0), the MS 400 attempts to decode the E-MBS MAP 450 in step 409. For example, when Super Frame 461 having an SFN of 4 is the current Super Frame, the MS 400 will determine in step 407 that SFN mod 4=0. In that case, the MS will proceed to step 409 and attempt to decode the E-MBS MAP 450. However, because the E-MBS MAP 450 has not been transmitted in Super Frame 461, the MS 400 will determine in step 409 that it is not able to decode the E-MBS MAP 450. In that case, the MS 400 will proceed to step 411 wherein the counter value i is increased by 1 and then return to step 405.

Having increased the counter by 1 and determined that i≤N in step 405, the MS 400 next determines if SFN mod 8=0 in step 407. That is, because the MS 400 has determined that the E-MBS MAP 450 was not available in SFN 4, the MS 400 will attempt to decode the E-MBS MAP 450 using the periodicity of the next MSI, which, in this case, is MSI 2 420 having a periodicity of 8 Super Frames. Thus, when the current Super Frame is Super Frame 463, the MS 400 will determine in step 407 that SFN mod 8=0 and again attempt to decode the E-MBS MAP 450 in step 409. However, because the E-MBS MAP 450 was not transmitted in Super Frame 463, the MS 400 again increases the counter i and next attempts to decode the E-MBS MAP 450 by determining if SFN mod 16=0 based on the periodicity of MSI 3 430. Thus, when Super Frame 465 is the current Super Frame, the MS 400 will determine that SFN mod 16=0 and attempt to decode the E-MBS MAP 450. Since the E-MBS MAP 450 was not transmitted in Super Frame 465, the MS 400 will next determine if SFN mod 32=0 based on the periodicity of MSI 4 440. Upon reaching Super Frame 467, the MS 400 will determine that SFN mod 32=0 and again attempt to decode the E-MBS MAP 450. This time, because the E-MBS MAP was transmitted in Super Frame 467, the MS will successfully decode the E-MBS MAP 450 in step 409 and end the procedure.

Referring again to FIG. 4A, if it is determined in step 405 that the value of the counter variable i>N, the MS ends the procedure. Also, referring to step 407, if it is determined that the SFN of the current Super Frame mod periodicity of the $i^{th}$ MSI does not equal 0, the MS continues performing step 407.

As illustrated in step 407 of FIG. 4A, exemplary embodiments of the present invention provide a more efficient method of decoding E-MBS MAP using the known number N of MSIs and the known periodicity of each MSI. In the example of FIGS. 4A and 4B, the MS was able to efficiently decode the E-MBS MAP using a logic based on the SFN of a current Super Frame and the periodicity of each successive MSI. Of course, the logic and sequence illustrated in FIGS. 4A and 4B is merely an example and it is to be understood that changes in the logic and/or sequence are within the scope of this invention. For example, the MS may perform the modulo operation starting with the highest periodicity of the N MSIs rather than the smallest periodicity. That is, in the above example of FIGS. 4A and 4B, the MS may simply determine if the SFN of the current Super Frame mod 32=0 without any previous determinations based on shorter MSIs. In that case, each of the lower periodicities (i.e., 16, 8 and 4 Super Frames) would implicitly be considered because SFN mod 32=0 also satisfies SFN mod 16=0, SFN mod 8=0, and SFN mod 4=0. Furthermore, when using the highest value of MSI periodicity, the MS would be able to decode the E-MBS MAP using fewer resources as compared to a decoding process that starts with the smallest MSI periodicity. That is, in the example of FIGS. 4A and 4B, the MS would only attempt to decode the E-MBS MAP every 32 Super Frames. On the other hand, attempting to decode the E-MBS MAP using a process similar to that of FIGS. 4A and 4B that starts with the smallest MSI periodicity would allow the MS to decode the E-MBS MAP more quickly if the periodicity of the MSI is less than 32 Super Frames. Therefore, the MS is able to choose an algorithm for decoding the E-MBS MAP that most efficiently uses available resources. This also illustrates the benefit of using MSI periodicities that are nested multiples of each other as well as the benefit of avoiding the signaling of an E-MBS MAP transmission indicator, which saves that resource in the SFH.

Furthermore, the logic of step 407 need not necessarily use a modulo operator. Instead, the logic of determining an appropriate Super Frame for decoding E-MBS MAP may be based on any logic exploiting the known values of N and the related periodicities.

In the above exemplary embodiments, a description is provided of an MS that determines which of N MSIs is currently being used by a network to transmit an E-MBS MAP. That is, the above examples assume that the MS is unaware of the current MSI used by the network and needs to determine the MSI in order to decode the E-MBS MAP. The following exemplary embodiments illustrate methods that may be used by an MS when the MS is aware of the current MSI and the MSI is changed.

Figure 5A:
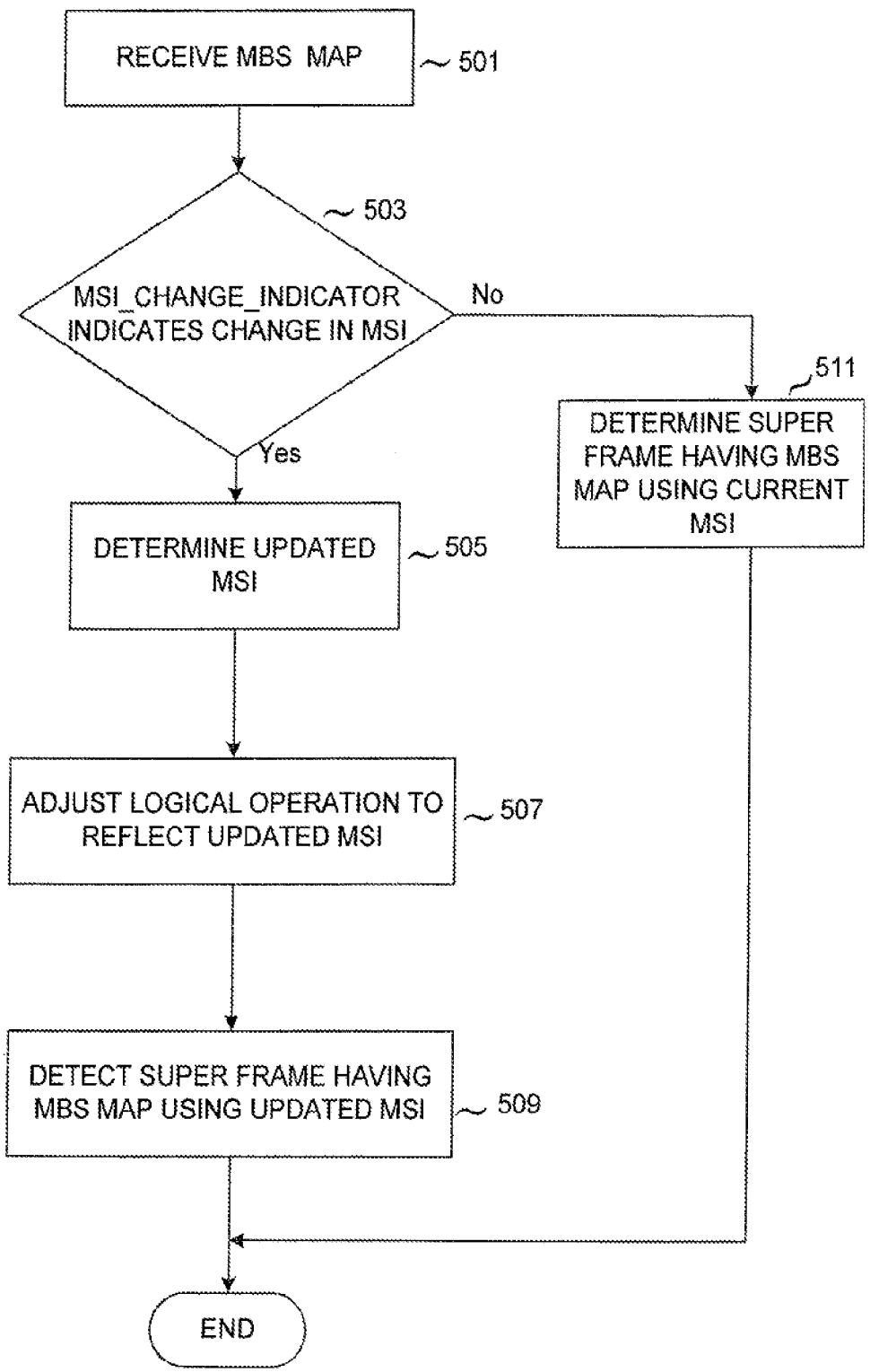
FIG. 5A is a flowchart illustrating a method for receiving a dynamically configured MSI according to an exemplary embodiment of the present invention.
Figure 5B:
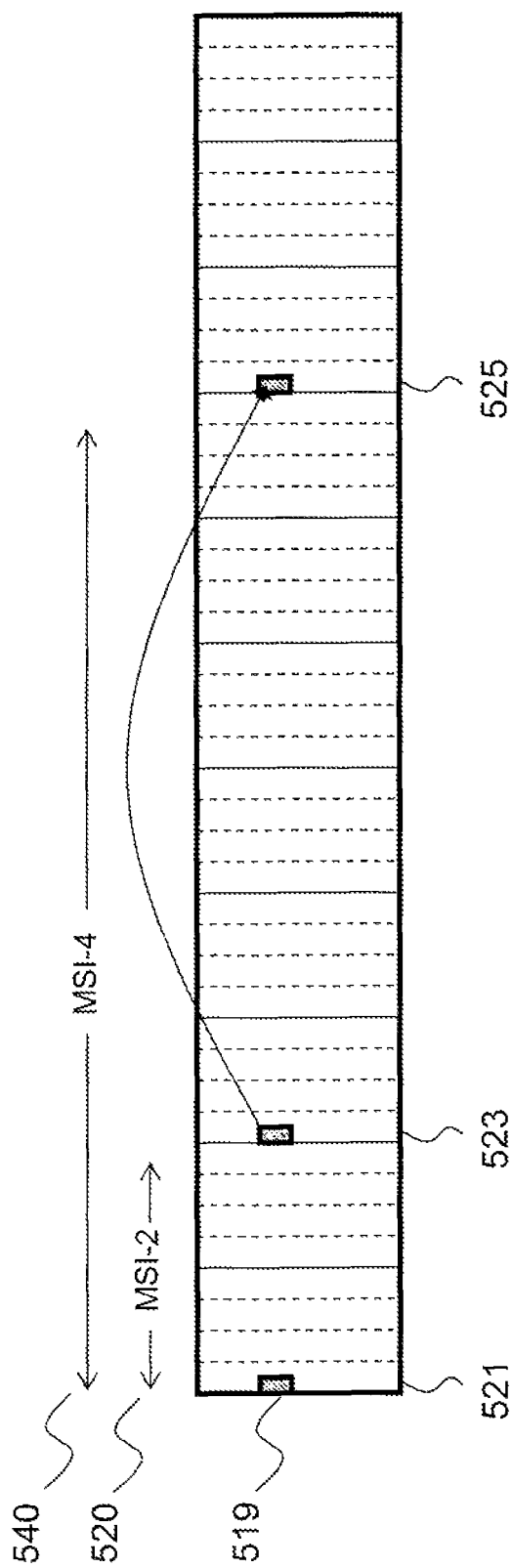
FIG. 5B illustrates transmission of a dynamically configured MSI according to an exemplary embodiment of the present invention.

FIG. 5A is a flowchart illustrating a method for receiving a dynamically configured MSI according to an exemplary embodiment of the present invention. FIG. 5B illustrates transmission of a dynamically configured MSI according to an exemplary embodiment of the present invention.

According to an exemplary embodiment of the present invention, the MSI is dynamically configurable from a current MSI to any of N allowable MSIs. That is, depending on the various requirements of E-MBS traffic to be transmitted, the BS or other E-MBS provider may determine that a change in MSI is necessary. To indicate the change from one MSI to another, the present invention introduces the variable MSI_CHANGE_INDICATOR. Using the variable MSI_CHANGE_INDICATOR, the BS can indicate that the MSI is being changed. In an exemplary implementation, the variable MSI_CHANGE_INDICATOR is transmitted with the E-MBS MAP and can be one bit long. In that case for example, setting MSI_CHANGE_INDICATOR to '1' indicates that there are additional bits signaling the new MSI. Upon determining that the MSI_CHANGE_INDICATOR is present and indicates a change in the MSI, an MS may update its decoding logic to reflect the new MSI.

For example, in an E-MBS system having four MSIs as illustrated in FIG. 2, it is assumed that a serving BS indicates in the E-MBS MAP that the MSI is changing. In that case, the MS will adjust its logical operator for detection of E-MBS MAP to reflect the updated MSI. In the exemplary case that the MSI is changing from MSI-2 (periodicity 8 Super Frames) to MSI-4 (periodicity 32 Super Frames), the BS will indicate the change using the MSI_CHANGE_INDICATOR variable, and will provide the updated MSI using additional bits. In response, the MS will adjust its logical operator to reflect the updated MSI. For example, if the MS is using the modulo operator as the logical operator as illustrated in FIG. 4, the MS will evaluate for the condition of SFN mod 32=0 rather than SFN mod 8=0 in order to decode the E-MBS MAP. Notably, although the variables used in the logical operator have changed, in this case from 8 to 32, the decoding logic has not changed.

Regarding the signaling of the new MSI, the BS may provide additional bits in the E-MBS MAP indicating the periodicity of the new MSI or may simply indicate which of the N number of MSIs is the updated MSI. For example, if the number of periodicities N is fixed and thus known to the MS, the BS may simply indicate which of the N MSIs is the updated MSI. Alternatively, if the number of periodicities is variable, the BS may transmit information regarding the periodicity of the updated MSI. Furthermore, in the case of FIG. 2, signaling used to indicate a change from MSI-2 to MSI-4, for example, is made simpler based on the nested relationship between the MSIs. That is, because MSI-2 is nested within MSI-4, MSI-4 being a multiple of MSI-2, the signaling necessary to indicate a change from MSI-2 to MSI-4 is reduced.

Referring to FIG. 5A, an MS receives an E-MBS MAP from a serving BS in step 501. In step 503, the MS determines if the value of MSI_CHANGE_INDICATOR in the E-MBS MAP indicates a change in the MSI. If the MS determines in step 503 that the MSI has changed, the MS determines the updated MSI in step 505. As discussed above, the MSI may be dynamically changed by the BS and provided in the E-MBS MAP wherein the variable MSI_CHANGE_INDICATOR indicates that the change has been made. In step 507, the MS uses the updated value of MSI to adjust the logical operation used to detect the E-MBS MAP. In step 509, the MS detects the E-MBS MAP using the logical operation that now includes the updated MSI and then ends the procedure.

On the other hand, if the MS determines in step 503 that the value of MSI_CHANGE_INDICATOR in the E-MBS MAP indicates no change in the MSI, the MS continues detecting the E-MBS MAP using the current MSI in step 511 and then ends the procedure.

Referring to FIG. 5B, when the MSI is dynamically changed, there will be a brief, aperiodic absence of the E-MBS MAP 519. However, this absence is transparent to the user. For example, FIG. 5B illustrates a case in which the BS dynamically changes the MSI from MSI-2 520 (periodicity of 8 Super Frames) to MSI-4 540 (periodicity of 32 Super Frames). In that case, the E-MBS MAP 519, initially transmitted with MSI-2 520, has been transmitted by the BS in Super Frame 521 and in Super Frame 523. In the transmission of E-MBS MAP 519 in Super Frame 523, the BS uses MSI_CHANGE_INDICATOR to indicate that the MSI will be changed and provides additional bits indicating that the MSI is changed to MSI-4 540. Accordingly, the BS next transmits the E-MBS MAP 519 in Super Frame 525, which is 28 Super Frames following the previous E-MBS MAP 519 transmittal. Accordingly, although transmission of the E-MBS MAP 519 in Super Frame 525 is aperiodic with the previous transmission and will thus cause an absence of the E-MBS MAP 519, the user is able to detect the E-MBS MAP 519 during its subsequent transmission and thus the absence is transparent to the user.

Figure 6:
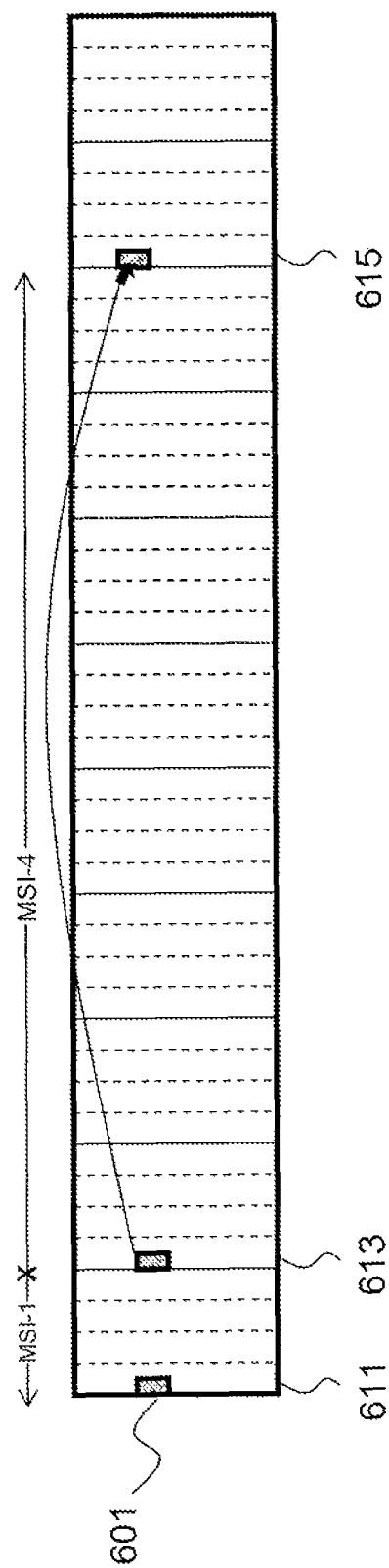
FIG. 6 illustrates transmission of a dynamically configured MSI according to an exemplary embodiment of the present invention.

FIG. 6 illustrates transmission of a dynamically configured MSI according to an exemplary embodiment of the present invention.

Referring to FIG. 6, transmission of E-MBS MAP 601 may be dynamically changed from a current MSI to a new MSI with no impact on the periodicity of the new MSI. In the example of FIG. 6, E-MBS MAP 601 is initially transmitted in Super Frame 611 and in Super Frame 613 based on the current MSI of MSI-1 (periodicity of 4 Super Frames). In the transmission of Super Frame 613, the BS indicates that the MSI is being changed to MSI-4 (periodicity of 32 Super Frames). According to an exemplary implementation, the BS may indicate the change of MSIs using the variable MSI_CHANGE_INDICATOR and provide additional bits regarding the new MSI in the E-MBS MAP. However, in a distinction from the embodiment illustrated in FIG. 5B, the periodicity of the new MSI (i.e., MSI-4) is based on the Super Frame in which the E-MBS MAP indicating the change in MSIs is transmitted, in this case Super Frame 613. To address this change, the BS begins broadcasting a value of $SF_{offset}$ using the broadcast channel beginning in Super Frame 613.

The value of $SF_{offset}$ corresponds to the difference between the current MSI and the updated MSI and can be used by the MS to detect the E-MBS MAP. In the example of FIG. 6, the BS transmits a value of $SF_{offset}$ corresponding to 4 Super Frames.

When the BS indicates that the MSI will be changed, an MS already decoding the E-MBS MAP and thus aware of the current MSI can determine a new E-MBS MAP transmission time using the value of $SF_{offset}$. More specifically, the MS may use the offset to determine the next Super Frame 615 that contains the E-MBS-MAP. In the example of FIG. 6, because the updated MSI is MSI-4 having a periodicity of 32 Super Frames, the MS may determine if the current Super Frame includes the E-MBS MAP by determining if the logic of $(SFN-SF_{offset})$ mod 32=0. For an MS joining the E-MBS service, the $SF_{offset}$ may be indicated as a management message or transmitted in the broadcast channel. Thus, the MS joining the service will use $SF_{offset}$ together with the SFN to determine when the E-MBS MAP is transmitted.

According to another exemplary embodiment of the present invention, the MSI is updated to a new value only when the SFN satisfies the logic for the largest MSI. For example, if the current MSI is set to MSI-1 having a periodicity of 4 Super Frames, the MSI may be changed to MSI-2 having a periodicity of 8 Super Frames only when the Super Frame satisfies condition of SFN mod 32=0. By limiting the change of the MSI in this manner, the periodicity of the MSI will not be affected and no additional signaling is required to indicate the new MSI.

Figure 7:
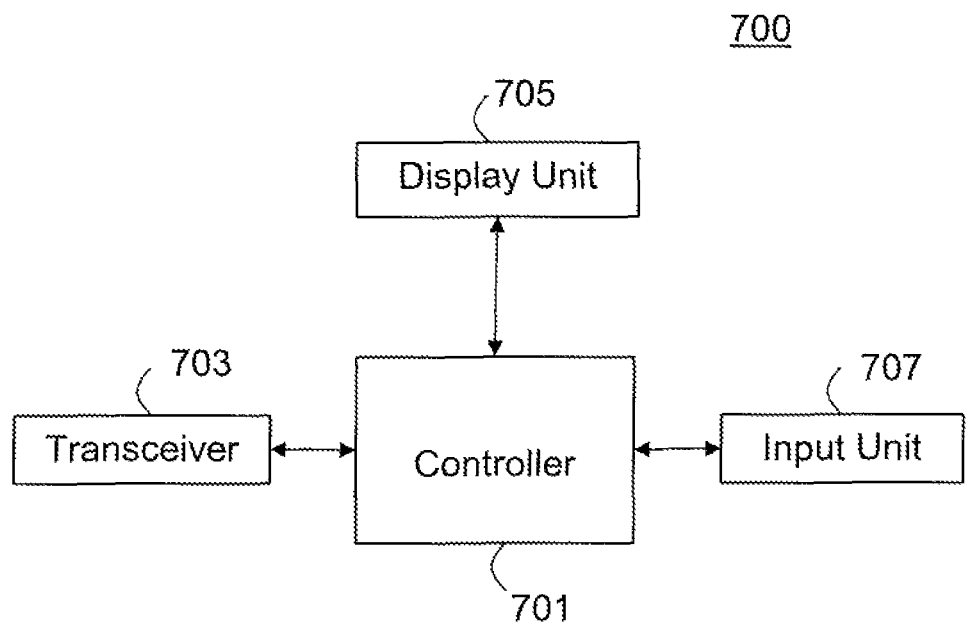
FIG. 7 illustrates a mobile terminal for determining an MSI according to an exemplary embodiment of the present invention.

FIG. 7 illustrates a mobile terminal for determining an MSI according to an exemplary embodiment of the present invention.

Referring to FIG. 7, the mobile terminal 700 includes a controller 701, a transceiver 703, a display unit 705, and an input unit 707. The controller 701 controls the overall functions of the mobile terminal including the decoding of an E-MBS MAP and determining MSIs as received from a BS or other MBS provider. The controller 701 may decode an E-MBS MAP as well as determine an MSI and its periodicity using any of the above described procedures. The transceiver 703 transmits and receives information to and from the MS. According to exemplary embodiments of the present invention, the transceiver 703 receives an E-MBS MAP from a BS or other E-MBS provider as well as information regarding a number N of MSIs used by the BS and the periodicity of each MSI. The transceiver 703 may also receive information regarding a change in the MSI such as an MSI_CHANGE_INDICATOR variable. Upon receipt of the information from the BS, the transceiver 703 provides the information to the controller 701 for processing. The display unit 705 displays various functions output by the controller 701 and may be provided as a Liquid Crystal Display (LCD). In this case, the display unit 705 may include a controller for controlling the LCD, a video memory in which image data is stored, and an LCD element. If the LCD is provided as a touch screen, the display unit 705 may perform a part or all of the functions of the input unit 707. The input unit 707 includes a plurality of keys used to receive input from a user. The plurality of keys may include alpha-numeric characters keys, function keys, soft keys, and the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for configuring Enhanced Multicast and Broadcast Service (E-MBS) Scheduling Intervals (MSIs) in a communication system including a controller, the method comprising:
    selecting, by the controller, a number N of MSIs;
    selecting, by the controller, respective periodicities of each of the N MSIs; and
    decoding, by the controller, an E-MBS MAP using the respective periodicities of each of the N MSIs,
    wherein the selecting of the respective periodicities of each of the N MSIs comprises selecting a base periodicity P and selecting each of the N MSIs to have a periodicity of M Super Frames, where M is a function of P and an integer i for $1 \leq i \leq N$.

2. The method of claim 1, wherein the selecting of the number N of MSIs comprises selecting four MSIs and the selecting of the respective periodicities of each of the N MSIs comprises respectively selecting periodicities of 2 Super Frames, 4 Super Frames, 8 Super Frames, and 16 Super Frames.

3. The method of claim 1, further comprising:
    transmitting an E-MBS MAP message at a periodicity of one of the N MSIs.

4. The method of claim 3 further comprising:
    transmitting an indication that the one of the N MSIs used for the transmission of the E-MBS MAP message is changed;
    transmitting information regarding another of the N MSIs to be used for transmission of the E-MBS MAP message; and
    transmitting the E-MBS MAP message at a periodicity of the other MSI.

5. The method of claim 4, wherein the transmitting of the indication that the one of the N MSIs used for the transmission of the E-MBS MAP message is changed comprises transmitting a single bit of information in the E-MBS MAP message.

6. A method for receiving an Enhanced Multicast and Broadcast Service (E-MBS) MAP, the method comprising:
    determining a number N of available E-MBS Scheduling Intervals (MSIs) and respective periodicities of each of the N MSIs; and
    determining if an E-MBS MAP is received in one of the MSIs using the respective periodicities of each of the N MSIs,
    wherein each of the N MSIs has a periodicity of M Super Frames, where M is a function of a base periodicity P and an integer i for $1 \leq i \leq N$.

7. The method of claim 6, wherein the determining if the E-MBS MAP is received comprises determining if the E-MBS MAP can be decoded.

8. The method of claim 6, wherein the one of the N MSIs has a shortest periodicity of the N MSIs.

9. The method of claim 8, further comprising determining if the E-MBS MAP is received using the MSI having a next shortest periodicity if it is determined that the E-MBS MAP was not received using the one of the N MSIs having the shortest periodicity.

10. The method of claim 6, wherein the one of the N MSIs has a longest periodicity of the N MSIs.

11. The method of claim 10, wherein the MSI having a shortest periodicity is a nested multiple of the one of the N MSIs.

12. The method of claim 6, wherein the determining the number N of E-MBS MSIs and the respective periodicities of each of the N MSIs comprises at least one of retrieving one or more known values and receiving a signal indicating the number of E-MBS MSIs and the periodicity of each MSI.

13. The method of claim 12, wherein the receiving of the signal indicating the number of E-MBS MSIs and the respective periodicities of each MSI comprises receiving a Medium Access Control (MAC) management message including the E-MBS MSIs.

14. The method of claim 6, wherein the determining if the E-MBS MAP is received using the one of the N MSIs comprises:
 determining a Super Frame Number (SFN) of a current Super Frame; and
 performing a logical operation using the respective periodicities of the one of the N MSIs and the SFN.

15. The method of claim 14, wherein the performing of the logical operation using the respective periodicities of the one of the N MSIs and the SFN comprises determining if the equation (SFN mod periodicity of the one of the N MSIs=0) is satisfied, wherein mod is the modulo operator.

16. The method of claim 6, further comprising:
 if it is determined that the E-MBS MAP is received using the one of the N MSIs, using the one of the N MSIs to periodically receive additional E-MBS MAPs;
 receiving an indication that the MSI is changing to another of the N MSIs; and
 receiving additional E-MBS MAPs using the other of the N MSIs.

17. The method of claim 16, wherein the indication that the MSI is changing consists of a single bit.

18. An apparatus for configuring Enhanced Multicast and Broadcast Service (E-MBS) Scheduling Intervals (MSIs) in a communication system, the apparatus comprising:
 a transmitter for transmitting an E-MBS MAP;
 a controller for selecting a number N of MSIs, and for selecting respective periodicities of each of the N MSIs; and
 a decoder for decoding an E-MBS MAP using the respective periodicities of each of the N MSIs,
 wherein the controller selects a base periodicity P and selects each of the N MSIs to have a periodicity of M Super Frames, where M is a function of P and an integer i for 1≤i≤N.

19. The apparatus of claim 18, wherein the controller selects the number N of MSIs by selecting four MSIs and selects the respective periodicities of each of the N MSIs by respectively selecting periodicities of 2 Super Frames, 4 Super Frames, 8 Super Frames, and 16 Super Frames.

20. The apparatus of claim 18, wherein the transmitter transmits the E-MBS MAP message at a periodicity of one of the N MSIs.

21. The apparatus of claim 20, further wherein the transmitter transmits an indication that the one of the N MSIs used for the transmission of the E-MBS MAP message is changed, transmits information regarding another of the N MSIs to be used for transmission of the E-MBS MAP message, and transmits the E-MBS MAP message at a periodicity of the other MSI.

22. The apparatus of claim 21, wherein the transmitter transmits the indication that the one of the N MSIs used for the transmission of the E-MBS MAP message is changed by transmitting a single bit of information in the E-MBS MAP message.

23. An apparatus for receiving an Enhanced Multicast and Broadcast Service (E-MBS) MAP, the apparatus comprising:
 a transceiver for receiving the E-MBS MAP; and
 a controller for determining a number N of available E-MBS Scheduling Intervals (MSIs) and respective periodicities of each of the N MSIs, and for determining if the E-MBS MAP is received in one of the N MSIs using the respective periodicities of each of the N MSIs, wherein each of the N MSIs has a periodicity of M Super Frames, where M is a function of a base periodicity P and an integer i for 1≤i≤N.

24. The apparatus of claim 23, wherein the controller, if it is determined that the E-MBS MAP is received using the one of the N MSIs, uses the one of the N MSIs to periodically receive additional E-MBS MAPs, receives an indication that the MSI is changing to another of the N MSIs, and receives additional E-MBS MAPs using the other of the N MSIs.

25. The apparatus of claim 24, wherein the indication that the MSI is changing consists of a single bit.

26. The apparatus of claim 23, wherein the one of the N MSIs has a shortest periodicity of the N MSIs.

27. The apparatus of claim 26, wherein the controller determines if the E-MBS MAP is received using the MSI having a next shortest periodicity if it is determined that the E-MBS MAP was not received using the one of the N MSIs having the shortest periodicity.

28. The apparatus of claim 23, wherein the one of the N MSIs has a longest periodicity of the N MSIs.

29. The apparatus of claim 28, wherein the MSI having a shortest periodicity is a nested multiple of the one of the N MSIs.

30. The apparatus of claim 23, wherein the controller determines if the E-MBS MAP is received by determining if the E-MBS MAP is decodable.

31. The apparatus of claim 23, wherein the controller determines the number N of E-MBS MSIs and the respective periodicities of each of the N MSIs by at least one of retrieving one or more known values and receiving a signal indicating the number of E-MBS MSIs and the respective periodicity of each MSI.

32. The apparatus of claim 31, wherein the controller receives the signal indicating the number of E-MBS MSIs and the respective periodicity of each MSI by receiving a Medium Access Control (MAC) management message including the E-MBS MSIs.

33. The apparatus of claim 23, wherein the controller determines if the E-MBS MAP is received using the one of the N MSIs by determining a Super Frame Number (SFN) of a current Super Frame, and by performing a logical operation using the respective periodicities of the one of the N MSIs and the SFN.

34. The apparatus of claim 33, wherein the controller performs the logical operation using the respective periodicities of the one of the N MSIs and the SFN by determining if the equation (SFN mod periodicity of the one of the N MSIs=0) is satisfied, wherein mod is the modulo operator.

* * * * *